(12) United States Patent
Zavala et al.

(10) Patent No.: US 7,784,982 B2
(45) Date of Patent: Aug. 31, 2010

(54) WRAPAROUND LIGHT ASSEMBLY

(75) Inventors: Carlos Gerardo Navarro Zavala, Farmington Hills, MI (US); Jeffrey Alan Mesko, Farmington Hills, MI (US); Thomas W. Schumacher, Farmington Hills, MI (US); Kent J. Agne, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 216 days.

(21) Appl. No.: 12/046,982

(22) Filed: Mar. 12, 2008

(65) Prior Publication Data

US 2009/0231870 A1    Sep. 17, 2009

(51) Int. Cl.
*B60Q 1/00* (2006.01)

(52) U.S. Cl. ........................ 362/487; 362/476; 362/507; 362/546

(58) Field of Classification Search ................. 362/487, 362/476, 507, 546, 267; 296/203.04, 193.08
See application file for complete search history.

(56) References Cited

U.S. PATENT DOCUMENTS

| | | | |
|---|---|---|---|
| 4,318,161 A | 3/1982 | Shanks | |
| 4,488,206 A * | 12/1984 | Mizusawa | 362/549 |
| 4,994,942 A | 2/1991 | Georgeff | |
| 5,424,923 A | 6/1995 | Young et al. | |
| 5,964,619 A * | 10/1999 | Pacini et al. | 439/577 |
| 6,793,359 B2 | 9/2004 | Iwamoto | |
| 6,951,365 B2 | 10/2005 | Chase et al. | |
| 6,997,586 B2 * | 2/2006 | Lee | 362/507 |
| 7,014,254 B2 * | 3/2006 | Rijsbergen et al. | 296/187.01 |
| 7,033,053 B2 * | 4/2006 | Watson et al. | 362/515 |
| 7,220,033 B1 * | 5/2007 | Yeh | 362/545 |
| 2002/0085389 A1 * | 7/2002 | Cheron et al. | 362/545 |
| 2008/0031004 A1 * | 2/2008 | Chu | 362/545 |

* cited by examiner

*Primary Examiner*—Sandra L O'Shea
*Assistant Examiner*—Evan Dzierzynski
(74) *Attorney, Agent, or Firm*—Young Basile

(57) ABSTRACT

A wraparound light assembly for a vehicle. A lens is attached to a housing. A body panel defines an interior vehicle space, and the body panel includes a recessed portion defining an aperture. The housing overlays at least part of the recess. A grommet is disposed in the aperture and extends through the body panel into the interior vehicle space. The grommet defines a receptacle having an opening facing the housing. A projection extends from the housing. The projection is configured to be slidably engaged in the receptacle along an installation axis and to extend into a portion of the receptacle in the interior vehicle space.

20 Claims, 5 Drawing Sheets

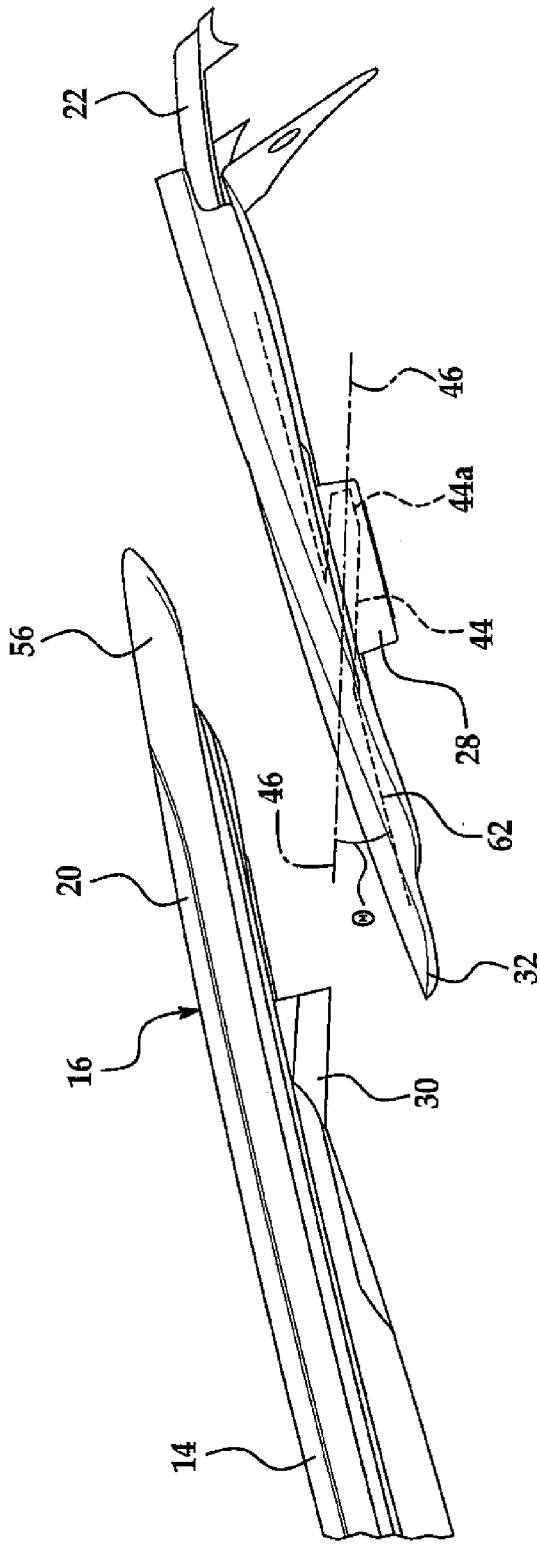
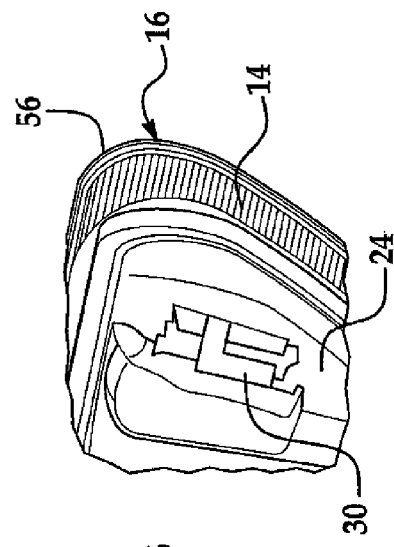
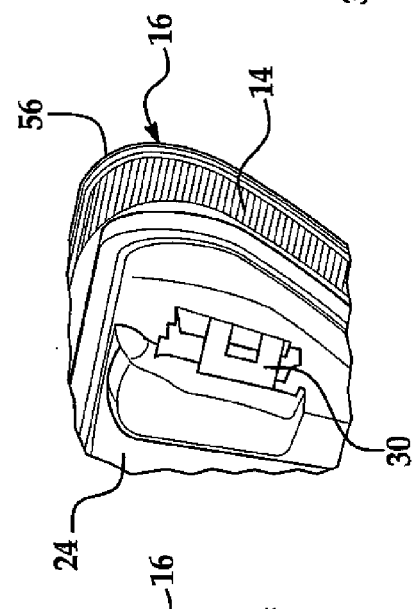
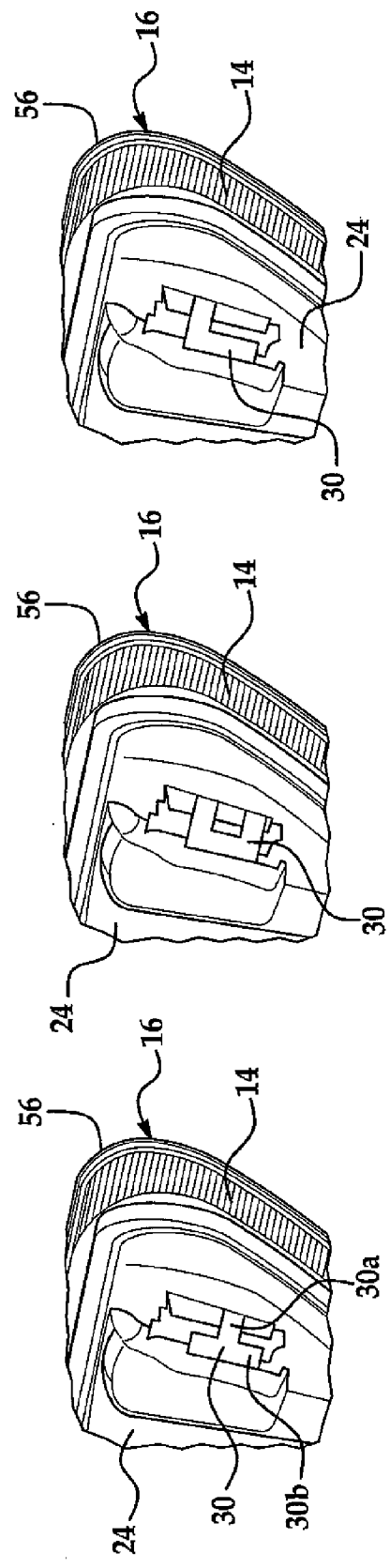

WRAPAROUND LIGHT ASSEMBLY

FIELD OF THE INVENTION

The present invention pertains to the field of automotive lights, and more particularly to devices for attaching wraparound light assemblies to vehicle body panels.

BACKGROUND

Wraparound lights include a lens having surfaces facing two directions, such as a vehicle front direction and a vehicle side direction, or a vehicle rear direction and a vehicle side direction. A housing attaches to the lens and encloses the lamp, electronics and other components of the light assembly. Some wraparound lights are designed to have an aggressive or sporty shape for aesthetic reasons. A sports car, for example, can include a lens with a side-facing surface that includes a V-shaped cantilevered section. However, the cantilevered section of the lens must be secured to the vehicle to ensure a pleasing fit and finish, as well as to prevent the lens from undesired movement. Conventionally, the cantilevered section is secured by including a female portion of a clip on the housing and a male portion of the clip on a stamped recess formed in the body panel.

SUMMARY

In one disclosed embodiment, a wraparound light assembly is provided for a vehicle body. The wraparound light assembly includes a housing, a lens attached to the housing, a body panel defining an interior vehicle space, a grommet, and a projection extending from the housing. The body panel includes a recessed portion defining an aperture, and the housing overlays at least part of the recess. The grommet is disposed in the aperture and extends through the body panel into the interior vehicle space. The grommet defines a receptacle having an opening facing the housing. The projection is configured to be slidably engaged in the receptacle along an installation axis and to extend into a portion of the receptacle in the interior vehicle space.

In another embodiment, a wraparound light is provided for a vehicle having at least one body panel defining an interior vehicle space and including a receptacle extending into the interior vehicle space. The wraparound light includes a housing, a lens attached to the housing, and a projection extending from the housing. The lens has a first portion facing a first vehicle direction and a second portion facing a second vehicle direction. The projection is configured to engage the receptacle along an installation axis and to extend into a portion of the receptacle in the interior vehicle space.

In another embodiment, a grommet is provided for attaching a vehicle light assembly to a vehicle body panel, the body panel defining an interior vehicle space and an aperture. The grommet includes a body configured to be mounted in the aperture and to extend through the aperture into the interior vehicle space. The body includes a flanged rim abutting a perimeter of the aperture. The body defines a channel extending at least from a plane defined by the flanged rim into a portion of the body in the interior vehicle space.

BRIEF DESCRIPTION OF THE DRAWINGS

The description herein makes reference to the accompanying drawings wherein like reference numerals refer to like parts throughout the several views, and wherein:

FIG. 7 is an exploded top view of a projection being inserting into a grommet along an installation axis;

FIGS. 8A-C are views along the installation axis illustrating exemplary projection shapes.

DETAILED DESCRIPTION

Figure 1:
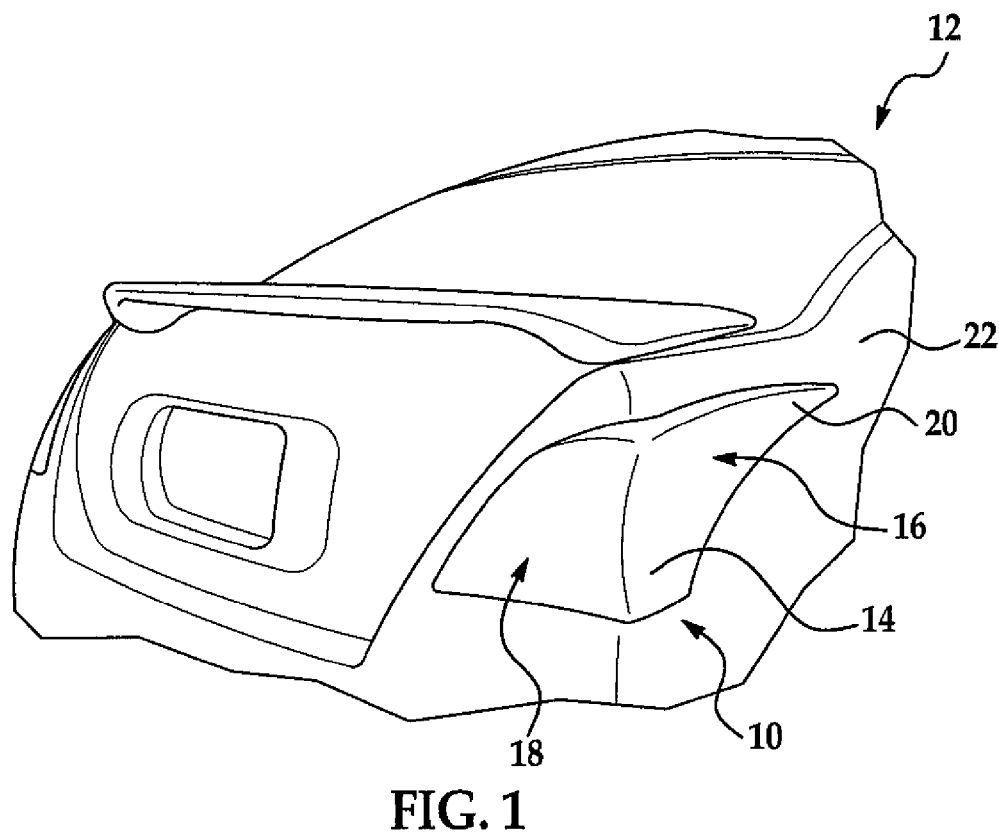
FIG. 1 is a side view of a vehicle with a lens having an aggressive or sporty shape.

FIG. 1 illustrates a wraparound light assembly 10 for a vehicle 12. The light assembly 10 includes a lens 14 having a first surface, the side-facing surface 16 as illustrated, and a second surface, the rear-facing surface 18 as illustrated. The side-facing surface 16 of the lens 14 can include a V-shaped cantilevered section 20.

Conventional wraparound lights rarely include a lens with a cantilevered section as aggressively or sporty shaped as the illustrated lens 14 because of the additional manufacturing costs conventionally associated with including such an aggressively shaped lens. The cantilevered section 20 should be attached to a portion of the vehicle 12, such as a body panel 22, to ensure a quality fit and finish and to prevent the cantilevered section 20 from unintended movement.

In order to connect a lens to a body panel, conventional wraparound light assemblies require stamping a recess in the body panel to permit room for the inclusion of a male member of a clip on the body panel and a female member of the clip on a housing connected to the lens. The geometry of the conventional lens can require the recess in the body panel to be deep relative to its width to provide adequate space for the lens, housing, and male and female members of the clip, for example, when the lens includes an aggressive or sporty shape such as the illustrated cantilevered portion 20. However, an adequately deep recess is often not feasible because the sheet metal from which the body panel is formed cannot withstand the forces required to form a deep and, especially toward the tip of an aggressive or sporty cantilevered section, narrow recess. As a result, the sheet metal often fractures or is rendered too weak for use.

Moreover, additional design sacrifices are required to ensure the recess is not too deep. For example, to limit the depth of the recess, the conventional housing does not extend to adjacent the vertex of the lens. This sacrifice prevents the lens from being adequately supported. Additionally, the aggressive or sporty cantilevered section is conventionally purely ornamental because there is insufficient space between the body panel and the housing or lens to include functional components, such as a lamp or LED to emit light through the cantilevered section.

To overcome the problems associates with deep and narrow recesses, a second piece of sheet metal or other material can be attached to the recessed portion of the body panel to provide additional depth and strength. However, attaching the second piece adds weight as well as cost to the light assembly. As a result, designers have previously had to either avoid aggressively or sporty shaped cantilevered sections or use a costly-to-produce body panel.

The wraparound light assembly 10 as recited in the claims overcomes the problems associated with connecting the lens of a conventional light assembly to a body panel. As illustrated in FIGS. 1-9, the light assembly 10 includes a housing 24, a lens 14 attached to the housing 24, a body panel 22 defining an interior vehicle space 26, a grommet 28, and a projection 30 extending from the housing 24.

Figure 2:
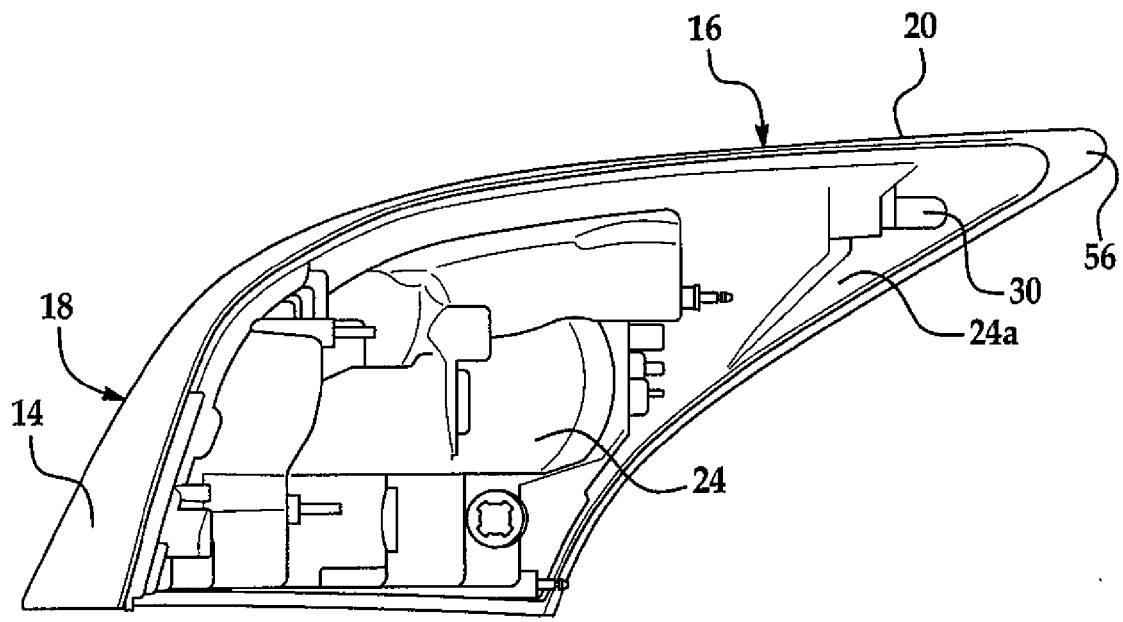
FIG. 2 is a side view of the inside of a housing attached to a lens with a projection extending from the housing.
Figure 3:
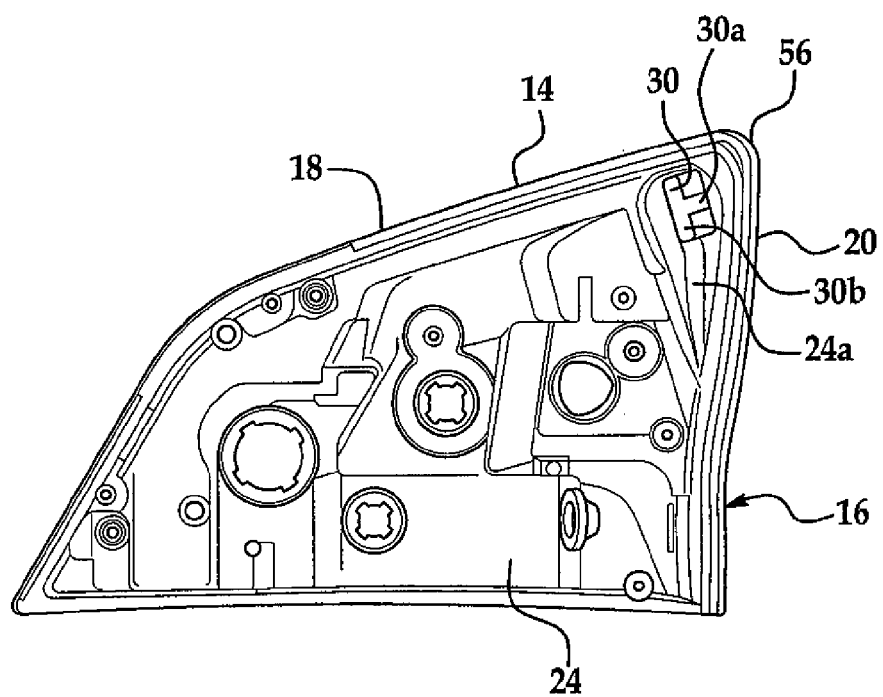
FIG. 3 is an end view of the inside of the housing and lens of FIG. 2.

As illustrated in FIGS. 2 and 3, the housing 24 can be attached to the rear of the lens 14. The housing 24 can be made of ASA, a different plastic, a composite, or other another material recognized as suitable by one of skill in the art having knowledge of the present application. The housing 24 need not necessarily be formed integrally; i.e., it can include multiple separate pieces. For example, a portion of the housing 24 enclosing the lamp can be separately formed from a portion of the housing 24 extending along the cantilevered section 20 of the lens. The housing 24 can be welded, glued, screwed, clipped, or otherwise fastened to the lens 14.

The housing 24 can include a portion 24a extending along the cantilevered section 20 of the lens 14. This portion 24a at least partially overlays at least part of a recess 34 in the body panel 22 when the light assembly 10 is assembled. The portion 24a of the housing 24 can extend to adjacent a vertex 56 of the cantilevered section 20, though the housing 24 need not extend to adjacent the vertex 56. If the housing 24 extends all the way to the vertex 56 of the cantilevered section 20, the strength of the cantilevered section 20 can be maximized. However, if the housing 24 extends to the vertex 56, the housing 24 occupies space between the lens 14 and body panel 22 that can alternatively be used for another purpose. The extent to which the housing 24 extends along the cantilevered section 20 of the lens 14 can thus be tailored to a specific application by taking into consideration the availability of space between the lens 14 and the body panel 22 and the strength of the cantilevered section 20.

The housing 24 can be shaped to enclose the lamp, electronics, and other components included in the light assembly 10 in conjunction with the lens 14. The housing 24 typically has a complex shape correlated to the shape of the lamp and other enclosed electronics. As a result, the shape of the housing 24 can vary depending on the geometries of the enclosed components.

The lens 14 as illustrated includes the side-facing surface 16 and the rear-facing surface 18, shown from the vehicle 12 exterior in FIG. 1 and from the interior attached to the housing 24 in FIGS. 2 and 3. Alternatively or additionally, the lens 14 can include a front-facing, top-facing, or bottom-facing portion. While the rear-facing surface 18 can face squarely relative to a length of the vehicle 12 and the side-facing surface 16 can be angled ninety degrees relative to the rear-facing surface 18 to face squarely to a side of the vehicle 12, modern vehicles 12 generally include much more streamlined lens 14 designs. As such, the side-facing surface 16 and rear-facing surface 18 can be angled relative to the side-facing direction and rear-facing direction, respectively, and a bend between the surfaces 16, 18 can exceed ninety degrees. Moreover, neither surface 16, 18 need be planar. Often, the surfaces 16, 18 are curved and contoured to conform to a streamlined vehicle 12 design. As such, the surfaces 16, 18 are not necessarily oriented such that light passes perpendicularly through the lens 14.

The side-facing surface 16 of the lens 14 includes the cantilevered portion 20. The illustrated cantilevered section 20 is the substantially V-shaped section of the lens 14. However, the cantilevered section 20 need not include a V-shape. The cantilevered section 20 can have a rectangular shape, a curved shape, a more ornate shape, or any other shape recognized as suitable by one of skill in the art having knowledge of the present application. The rear-facing portion 18 can include a cantilevered section 20 in alternative or in addition to the cantilevered section 20 on the side-facing portion 16. Moreover, the wraparound light assembly 10 need not include a cantilevered section 20; the grommet 28 and projection 30 can be included on conventional lenses, which often are shaped like rectangles with rounded corners and do not include aggressive or sporty shapes.

Figure 4:
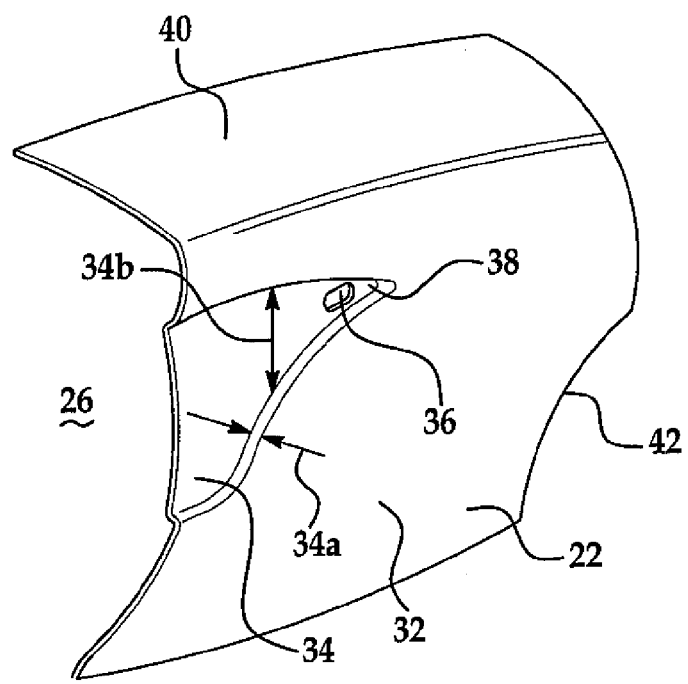
FIG. 4 is a perspective view of a body panel.
Figure 5:
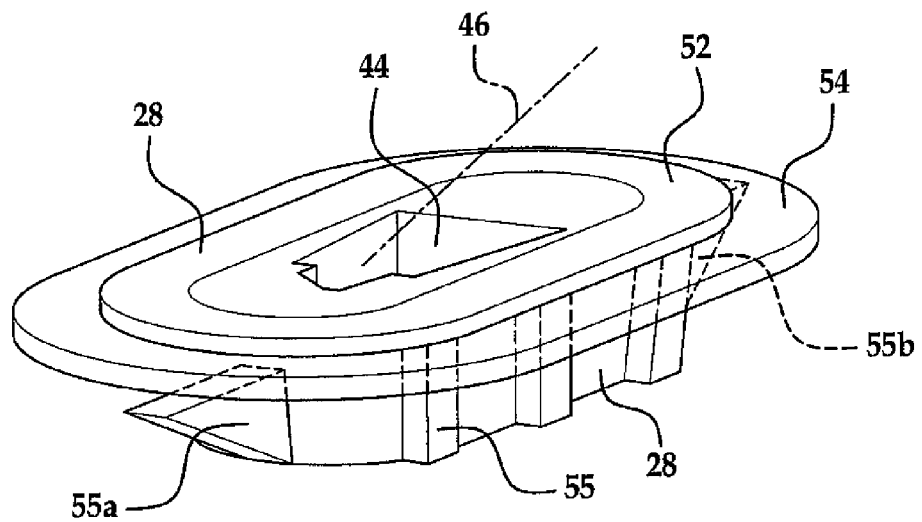
FIG. 5 is a perspective view of a grommet.

FIG. 4 illustrates the body panel 22, which defines the interior vehicle space 26. The interior vehicle space 26 can be, for example, a trunk if the light assembly 10 is a taillight. The body panel 22 as illustrated has a side panel 32 including a substantially V-shaped recess 34. The shape of the recess 34 corresponds to the shape of at least part of the cantilevered section 20. As such, the recess 34 can alternatively include a rectangular shape, a curved shape, a more ornate shape, or any other shape in which the cantilevered section 20 is formed. For example, if the lens 14 does not include an aggressive or sporty shape, i.e., if the lens 14 is conventionally shaped as a rectangle with rounded corners, then the recess 34 can be rectangular with rounded corners. The recess 34 can be dimensioned such that it can be stamped into the body panel 22, though the recess 34 can alternatively be formed by other manufacturing process, such as molding.

Dimensioning the recess 34 such that it can be stamped into the body panel 22 requires that the depth 34a of the recess 34 cannot be too large relative to the width 34b of the recess 34; otherwise, the recess 34 will be weak or fracture during stamping. The depth 34a to width 34b ratio that the body panel 22 can withstand depends on the geometry of the recess 34, the thickness of the body panel 22, and the material from which the body panel 22 is made. Thus, the body panel 22 can be formed by stamping sheet metal. Alternatively, the body panel 22 can be a molded composite, such as carbon fiber, or molded plastic.

The recess 34 defines an aperture 36. The placement of the aperture 36 corresponds to the placement of the projection 30 on the housing 24. As illustrated, the aperture 36 is adjacent to a vertex 38 of the recess 34.

The body panel 22 can additionally include a top panel 40 angled relatively to the side panel 32. The top panel 40 can form part of the hood or trunk of the vehicle 12. If the aggressive or sporty lens shape, e.g. the illustrated cantilevered section 20, is alternatively or additionally included on the rear-facing surface 18 of the lens 14, the recess 34 can alternatively or additionally be included on the top panel 40. The side panel 32 can additionally include at least part of a fender 42. The fender 42 can be at the opposing end of the body panel 42 from the recess 34.

FIGS. 5 and 6A-D illustrate embodiments of the grommet 28. The grommet 28 can be disposed in the aperture 36 in the body panel 22 such that the grommet 28 extends into the interior vehicle space 26. The grommet 28 defines a receptacle 44 oriented substantially along an installation axis 46. The receptacle 44 can be oriented in-line with the installation axis 46 or at a slightly different angel than the installation axis 46 to create tension between the body panel 22 and the lens 14. As illustrated, the receptacle 44 and installation axis 46 are obliquely angled relative to a plane 62 (as illustrated in FIG. 7) defined by the aperture 36.

Figure 6A:
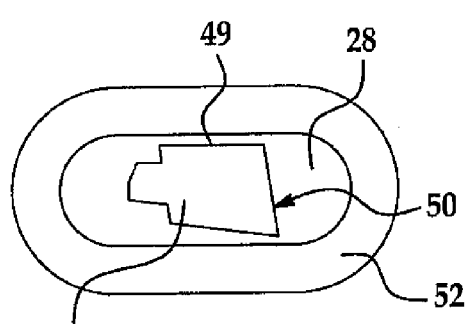
FIGS. 6A-D are top views illustrating exemplary openings in a grommet.
Figure 6B:
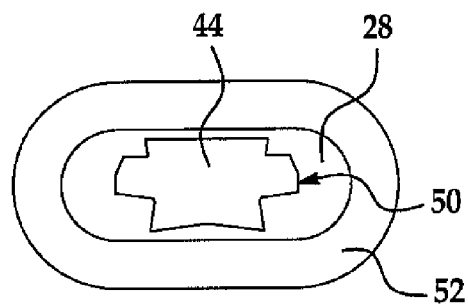
Figure 6C:
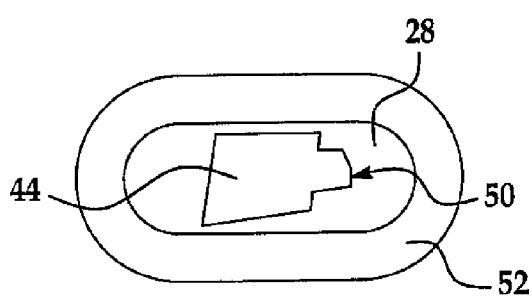
Figure 6D:
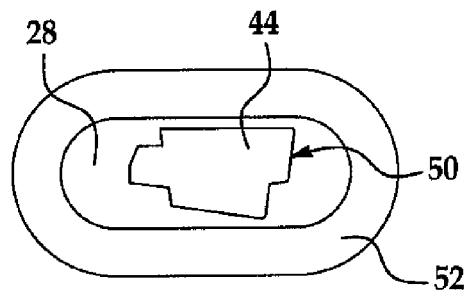

As illustrated in FIG. 6A, the receptacle 44 can have a substantially T-shaped opening 49 to securely hold the projection 30 in all directions orthogonal to the installation axis 46. Alternatively, the opening 49 of the receptacle 44 can have an L-shape, an oval or circular shape, an I-shape, or any other shape allowing the projection 30 to prevent movement of the lens 14 in directions orthogonal to the installation axis 46. Examples of various cross-sections are illustrates in FIGS. 6B-D. Also, if the opening 49 of the receptacle 44 is symmetrical, as shown in FIG. 6B for example, the same grommet 28 design can be used to secure lenses 14 on multiple sides of the vehicle 12, such as the left rear taillight and the right rear taillight. Symmetry along either the installation axis 46 or perpendicular to the installation axis 46 can permit the same grommet 28 design to be used.

The receptacle 44 can be blind, or it can extend through the grommet 28. If the receptacle 44 extends through the grommet 28, the fit between the grommet 28 and the projection 30 can be tight enough to prevent moisture from entering the interior vehicle space 26 or other means of ensuring moisture does not leak through the body panel can be included, if desired.

The opening 49 of the receptacle 44 faces the housing 24 when the wraparound light 10 is assembled. The opening 49 can have a continuous perimeter 50, which can correspond to the cross-sectional shape of the receptacle 44. The continuous perimeter 50 of the opening 49 permits the grommet 28 to contact every side of the projection 30, thus preventing movement of the projection 30 in any direction orthogonal to the installation axis 46.

A flange 52 can circumscribe the grommet 28, and a seal 54 can be placed on the opposing side of the flange 52 from the opening 49.

The grommet 28 can include at least one deflectable protrusion 55 on the opposing side of the flange 52 from the opening 49. The deflectable protrusions 55 can include springs or other deflectable geometries molded into the grommet 28 such that the grommet 28 can be pressed into the aperture 36 and held in place. Larger deflectable protrusions 55a, 55b can be included on the grommet 28 inline with the installation axis 46. The larger protrusions 55a, 55b are included to withstand the increased forces anticipated along the installation axis 46, such as the force of the projection 30 being pulled out of the receptacle 44. Instead of deflectable protrusions 55, the grommet 28 can be held in place by a clip, a screw, or any other fastening mechanism attached to the grommet 28 after it is inserted into the aperture 36. Alternatively, the grommet 28 need not include deflectable protrusions 55. For example, the grommet 28 can be held in place by a friction fit, or glued into the aperture 36.

As best illustrated in FIG. 7, the projection 30 extends from the housing 24 and defines the installation axis 46. The projection 30 can extend from the portion of the housing 24 adjacent the vertex 56 of the cantilevered section 20 of the lens 14. The closer to the vertex 56 of the lens 14 that the projection 30 is, the better the projection 30 secures the vertex 56 of the lens 14. However, placing the projection 30 close to the vertex 56 also increases the depth 34a to width 34b ratio required of the recess 34, making it more difficult to stamp the recess 34 into the body panel 22. The projection 30 can be substantially T-shaped as illustrated in FIG. 8A. The T-shape can be oriented such that the stem 30a of the T-shaped projection 30 extends substantially perpendicularly from the housing 22 in order to strengthen the crossbar 30b of the T-shaped projection 30. Alternatively, the cross-section of the projection 30 can have an L-shape, an oval or circular shape, an I-shape, or any other shape allowing the projection 30 to prevent movement of the lens 14 in directions orthogonal to the installation axis 46 when the projection 30 is inserted into the receptacle 44. Examples of various projection shapes are illustrated in FIGS. 8B and 8C.

Since there is only a small space between the lens 14 and the body panel 22 adjacent the cantilevered section 20 in which to connect the lens 14 to the body panel 22, the projection 30 should not occupy a large amount of room. On the other hand, the projection 30 should be strong enough to secure the cantilevered section 20 of the lens 14. Thus, the installation axis 46 can be at an oblique angle θ relative to a plane 62 defined by the aperture 36 when the projection 30 extends from a side-facing surface 16 of the lens 14.

Figure 9:
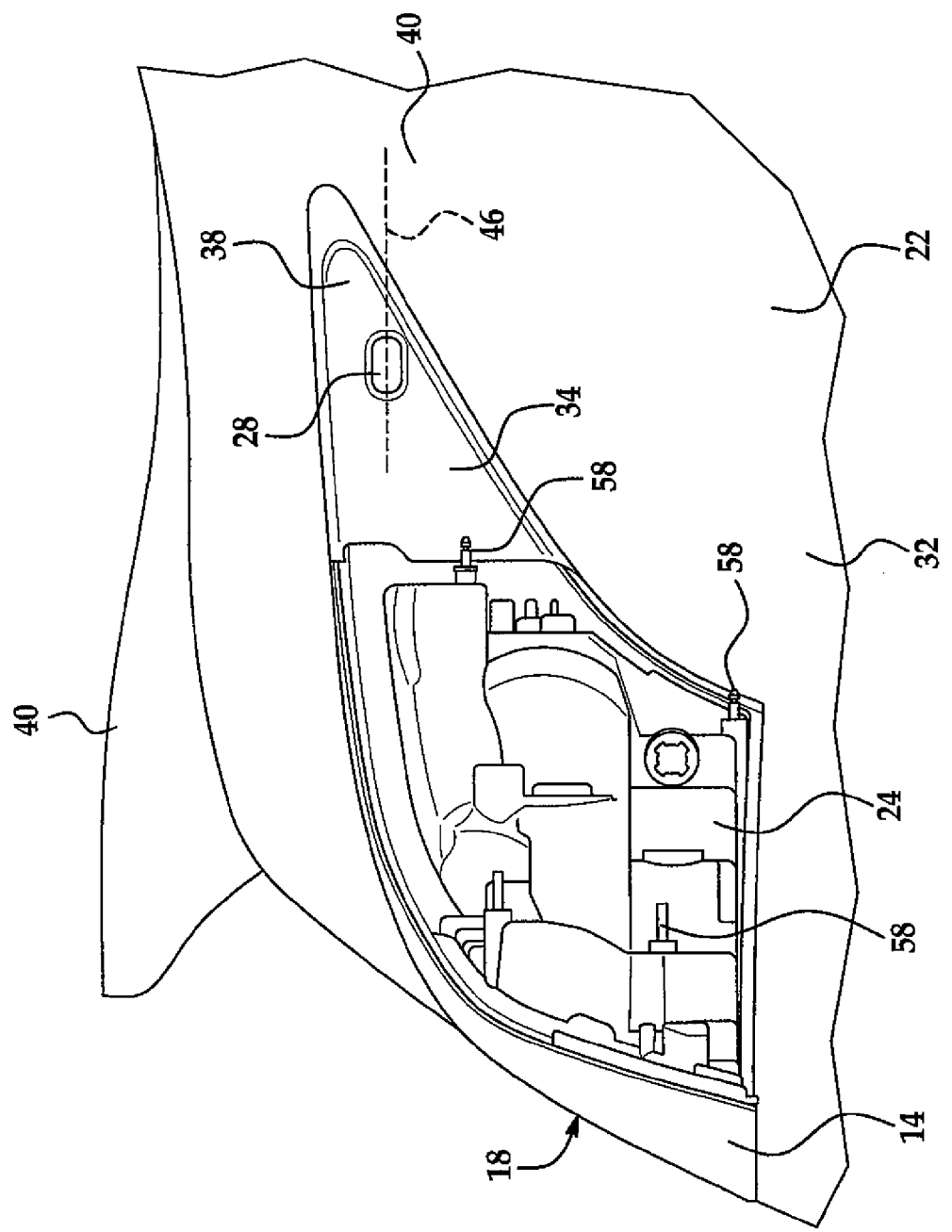
FIG. 9 is a view of a projection and grommet in an assembled position.

To assemble the light assembly 10, the lens 14 and housing 24 are slidably engaged with the body panel 22 along the installation axis 46 such that the projection 30 extends through the opening 49 of the grommet 28 and into a portion 44a of the receptacle 44 in the interior vehicle space 46. When assembled, the opening 49 on the grommet faces the housing 24, and at least a portion of the housing overlays the recess 34 on the body panel 22 so that the cantilevered section 20 is flush relative to the portion of the body panel 22 adjacent the recess 34 as illustrated in FIG. 9. Also when assembled, the additional fasteners 58 projecting from the housing 24 and are received by at least one additional flange (not shown) on the body panel 22 or other components of the vehicle 12 in order to secure the housing 24 and lens 14 to the vehicle 12.

Since the grommet 28 is placed in an aperture 36 on the recess 34, the projection 30 can extend through the body panel 22 into the interior vehicle space 26. As a result, the recess 34 can be shallow, and thus easily stamped into the body panel 22 without the need for an additional supporting plate attached to the body panel 22 to provide strength. Thus, the cost of producing the body panel 22 can be reduced. As a result, an aggressive or sporty lens 14 design can be inexpensively incorporated into the vehicle 12.

Moreover, the grommet 28 and projection 30 configuration permits the connection between the lens 14 and body panel 22 to be placed close to the vertex 56 of the lens 14 without requiring the recess 34 to be too narrow and deep to be structurally sufficient. Thus, the lens 14 can be more effectively secured.

Additionally, the grommet 28 and projection 30 configuration permits the housing 24 to extend to adjacent the vertex 58 of the lens 14 in order to support substantially the entire cantilevered section 20 of the lens 14. Thus, the lens 14 can be more effectively supported by the housing 24.

The configuration also creates sufficient space between even a shallow recess 34 and the lens 14 to include functional components, such as a lamp or LEDs emitting light out the cantilevered section of the lens 14. Thus, the cantilevered section 20 can be functional in addition to providing an aesthetic benefit.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A wraparound light assembly for a vehicle, the light assembly comprising:
   a housing having a first portion and a second portion;
   a lens attached to the housing;
   a body panel partially defining an interior vehicle space, the body panel including a recessed portion having a bottom surface and side walls defining a depth of the recessed portion, wherein at least a part of the second portion of the housing overlays the bottom surface of the recessed portion;

an aperture defined in the bottom surface of the recessed portion;

a grommet disposed in the aperture, the grommet extending through the bottom surface into the interior vehicle space, the grommet defining a receptacle having an opening facing the second portion of the housing; and a projection extending from the second portion of the housing, the projection configured to be slidably engaged in the receptacle along an installation axis and to extend into a portion of the receptacle in the interior vehicle space.

2. The wraparound light assembly of claim 1, wherein the installation axis is at an oblique angle relative to a plane defined by the aperture.

3. The wraparound light assembly of claim 2, wherein the opening of the grommet has a continuous perimeter.

4. The wraparound light assembly of claim 2, wherein the depth of the recessed portion is sufficiently small relative to a width of the recessed portion to permit the recessed portion to be stamped into the body panel.

5. The wraparound light assembly of claim 2, wherein the opening of the grommet and the projection of the second portion of the housing each are substantially T-shaped.

6. The wraparound light assembly of claim 1, wherein the lens includes a substantially V-shaped section, and wherein the projection extends from the second portion of the housing adjacent the substantially V-shaped section.

7. The wraparound light assembly of claim 6, wherein the body panel includes a first surface extending in a first vehicle direction and a second surface extending in a second vehicle direction, wherein the recessed portion is a substantially V-shaped depression on the first surface, and wherein a portion of the body panel adjacent the recessed portion flushly receives the lens.

8. The wraparound light assembly of claim 7, wherein at least part of the substantially V-shaped section overlays the bottom surface of the recessed portion.

9. The wraparound light assembly of claim 1, wherein the grommet includes a seal between its perimeter and a perimeter of the aperture.

10. The wraparound light assembly of claim 9, wherein the grommet includes a flange abutting the perimeter of the aperture, and wherein the seal is disposed between the flange and the recessed portion of the body panel.

11. The wraparound light assembly of claim 10, wherein the grommet includes at least one deflectable protrusion abutting an interior vehicle side of the recessed portion of the body panel.

12. The wraparound light assembly of claim 1, wherein the installation axis is parallel to a length of the grommet.

13. A wraparound light for a vehicle having at least one body panel defining an interior vehicle space, the body panel including a recessed portion extending into the interior vehicle space, the wraparound light comprising:

a housing;

a lens attached to the housing, the lens having a first portion facing a first vehicle direction and a second portion facing a second vehicle direction; and a projection extending from the housing, the projection configured to engage an aperture in a bottom surface of the recessed portion along an installation axis and to extend into the interior vehicle space, such that at least part of the first portion of the lens overlays the bottom surface of the recessed portion.

14. The wraparound light of claim 13, wherein the projection extends from the housing at an oblique angle.

15. The wraparound light of claim 14, wherein the first portion of the lens comprises a vertex of a substantially V-shape, the projection being disposed adjacent the vertex.

16. The wraparound light of claim 13, wherein the projection is substantially T-shaped, and wherein at least part of the first portion of the lens is configured to be substantially flush with a portion of the body panel adjacent the recessed portion.

17. A grommet for attaching a vehicle light assembly to a vehicle body panel, the vehicle body panel partially defining an interior vehicle space, the vehicle body panel having a perimeter, a portion of which abuts at least a portion of a housing of the vehicle light assembly, and an aperture spaced from the perimeter, the grommet comprising:

a body, the body configured to be mounted in the aperture and to extend through the aperture into the interior vehicle space, the body including a flanged rim abutting a perimeter of the aperture, and the body defining a channel extending at least from a plane defined by the aperture into a portion of the body in the interior vehicle space, the channel sized to receive a projection extending from a portion of the housing.

18. The grommet of claim 17, wherein the channel is configured to be obliquely angled relative to the aperture.

19. The grommet of claim 17, wherein the channel has a continuous perimeter.

20. The grommet of claim 19, wherein the channel has a T-shaped opening.

* * * * *